United States Patent
Boettcher et al.

(10) Patent No.: US 8,407,176 B2
(45) Date of Patent: Mar. 26, 2013

(54) DATA PROCESSING METHOD FOR CONTROLLING A NETWORK

(75) Inventors: Mirko Boettcher, Ipswich (GB); Detlef Nauck, Ipswich (GB); Dymitr Ruta, Ipswich (GB); Martin Spott, Ipswich (GB)

(73) Assignee: British Telecommunications plc, London (GB)

( * ) Notice: Subject to any disclaimer, the term of this patent is extended or adjusted under 35 U.S.C. 154(b) by 700 days.

(21) Appl. No.: 12/299,347

(22) PCT Filed: Apr. 26, 2007

(86) PCT No.: PCT/GB2007/001554
§ 371 (c)(1), (2), (4) Date: Nov. 3, 2008

(87) PCT Pub. No.: WO2007/129027
PCT Pub. Date: Nov. 15, 2007

(65) Prior Publication Data
US 2009/0240644 A1    Sep. 24, 2009

(30) Foreign Application Priority Data
May 5, 2006    (EP) .................................. 06252396

(51) Int. Cl.
*G06N 5/02* (2006.01)
*G06F 15/173* (2006.01)
(52) U.S. Cl. .......................................... 706/47; 709/223
(58) Field of Classification Search .................... None
See application file for complete search history.

(56) References Cited

U.S. PATENT DOCUMENTS

| 5,809,499 | A | 9/1998 | Wong et al. |
| 6,269,368 | B1 * | 7/2001 | Diamond ............................. 1/1 |
| 6,321,338 | B1 * | 11/2001 | Porras et al. .................... 726/25 |
| 6,353,902 | B1 * | 3/2002 | Kulatunge et al. ............ 714/712 |
| 2002/0082886 | A1 | 6/2002 | Manganaris et al. |
| 2004/0122790 | A1 | 6/2004 | Walker et al. |

FOREIGN PATENT DOCUMENTS

| WO | 01/31506 | 5/2001 |
| WO | 03/083660 | 10/2003 |
| WO | 2004/040421 | 5/2004 |

OTHER PUBLICATIONS

Bottcher, Discovering Interesting Temporal Changes in Assocations Rules, Apr. 24, 2005, 1-95.*

(Continued)

*Primary Examiner* — Alan Chen
*Assistant Examiner* — Paulinho E Smith
(74) *Attorney, Agent, or Firm* — Nixon & Vanderhye PC

(57) ABSTRACT

Patterns of change in system operating parameters are identified which may be used to identify unexpected operational conditions and to trigger an appropriate alert or action. A network is controlled using operating data for the network. Network operating data is received and divided into sequential time periods. A structural description such as an association rule is determined for the received data in each time period and a change pattern in the determined structural description is identified over the time periods. The network is then controlled using a predetermined action corresponding to a predetermined structural description change pattern in response to the identified structural description change pattern matching the predetermined structural description change pattern.

11 Claims, 9 Drawing Sheets

OTHER PUBLICATIONS

Porras et al. "Live Traffic Analysis of TCP/IP Gateways", ISOC Symposium on Network and Systems Security, Mar. 1998, pp. 1-13, XP002323297.

Wai Sum Lai AT&T Labs Richard W. Tibbs Oak City Networks & Solutions Steven Van Den, Berghe Ghent University/IMEC: "Requirements for Internet Traffic Engineering Measurement; Draft-Ietf-Tewg-Measure-06.txt", IETF Standard-Working Draft, Internet Engineering Task Force, vol. Tewg, No. 6, Jul. 2003, XP015003547.

Bordetsky A: "Agent-Based Support for Collaborative Data Mining in Systems Management" System Sciences, 2001. Proceedings of the 34th Annual Hawaii International Conference on Jan. 3-6, 2001, Piscataway, NJ, USA, IEEE, pp. 959-967, XP010549687.

Zaki et al. "NCDS: Data Mining for Discovering Interesting Network Characteristics" Information and Software Technology, Elsevier, Amsterdam, NL, vol. 47, No. 3, Mar. 1, 2005, pp. 189-198, XP004709048.

Keskinidis, Stellios, "Pattern Identification of Time Series Events: A Parallel Genetic Algorithm Approach," Queensland University of Technology, Nov. 2002, from the Internet: http://members.optusnet.com.au/stelliosk/dissertation/dissertation.pdf.

"An Introduction to Data Mining—Discovering hidden value in your data warehouse" from the internet: http://www.thearling.com/text/dmwhite/dmwhite.htm.

Parsaye, K., "From Data Management to Pattern Management," Information Management Magazine, Jan. 1, 1999 from the internet: http://www.information-management.com/issues/19990101/212-1.html.

Wright, Peggy, "Knowledge Discovery in Databases: Tools and Techniques," funded by U.S. Army Corps Engineers Waterways Experiment Station, Vicksburg, MS 39180, from the internet: http://www.acm.org/crossroads/xrds5-2/kdd.html.

Edelstein, H., "Data Mining: Exploiting the Hidden Trends in Your Data," IBM Database Magazine, Spring 1997, retrieved from the internet: http://www.ibmdatabasemag.com/shared/printArticle.jhtml?article=/db_area/archives/1997/q1/9701edel.shtml&pub=db2mag.

Liu, Bing et al., "Analyzing the Interestingness of Association Rules from the Temporal Dimension," retrieved from the internet: http://www.cs.uic.edu/~liub/publications/ICDM-2001.ps.

Agrawal, R., et al., "Active Data Mining," IBM Almaden Research Center, Retrieved from the internet: http://rakesh.agrawal-family.com/papers/kdd95active.pdf.

Bottcher, M., et al., "Detecting temporally redundant association rules," Proceedings of the Fourth International Conference on Machine Learning and Applications, Dec. 15-17, 2005.

"Data Mining and Discover*E," A White Paper on PDS Data Mining Technology, Pattern Discovery Software Systems Ltd., 1997-2002.

"What is Data Mining and What are its Uses?—100 Questions," Magazine, Darwin Online for Informed Executives, http://www.darwinmag.com/read/100103/mining.html.

International Search Report for PCT/GB2007/001554, mailed Jun. 12, 2007.

* cited by examiner

DATA PROCESSING METHOD FOR CONTROLLING A NETWORK

This application is the U.S. national phase of International Application No. PCT/GB2007/001554, filed 26 Apr. 2007 which designated the U.S. and claims priority to EP 06252396.4, filed 5 May 2006, the entire contents of each of which are hereby incorporated by reference.

TECHNICAL FIELD

The present invention relates to identifying patterns of change in system operating parameters which may be used to identify unexpected operational conditions and to trigger an appropriate alert or action. In particular though not exclusively, the invention relates to the identification of changes in a communications network operating parameters which may trigger an alarm or automatic reconfiguration of the network.

BACKGROUND

A network operator or technician monitoring and controlling a network typically relies on a number of key metrics to interpret the behaviour of the network, and if necessary make corrective or optimising reconfigurations of the network. Typically the network operator will receive alerts when certain operating parameters become critical, for example that one of the nodes is currently congested and is dropping packets. The network may then be reconfigured for example to route more traffic away from the congested node. A large practical network may have many hundreds or even thousands of nodes so that the task of monitoring these and adjusting the network may require a dedicated team of specialists. Typically however problems with network operation are only identified once they become critical and so management of the network is reactive. Furthermore the causes of a problem with one aspect of the network may not always be apparent, and may be due to sub-critical problems in other areas of the network which cannot normally be easily identified.

SUMMARY

In one aspect the present exemplary embodiments provides a method for controlling a network using operating data for the network such as traffic flow rates, packet drop rates, and so on for the various nodes of the network. The method comprises receiving the network operating data either from a database or other stored of existing data or a real-time feed of network data or parameters from a network monitoring process for example. The received data is then divided into sequential time periods, and one or more structural descriptions such as the support and/or confidence of association rules for the received data are determined in each time period. The method then identifies one or more change patterns in the determined structural description over the time periods, for example, how the determined association rule confidence and/or support change over the course of the time periods. Example change patterns include trends (upwards or downwards), spikes, discontinuities, and stabilities. The method then determines whether the identified change patterns (e.g. rule confidence and support change patterns) match any of a number of stored or predetermined change patterns, and if so, controls the network using a predetermined action corresponding to the predetermined structura description change pattern. For example, the network may be reconfigured to direct more traffic through one node if it is discovered that a correlation (e.g. association rule) between the traffic rate and the error rate in another node is trending upwards. This allows the method to take reconfiguration action in advance of a network issue or problem causing a major outage, for example.

The method may also be arranged to output all or a subset of the identified change patterns to a user such as a network operator. This may be useful when an identified change pattern does not match any of the predetermined change patterns and hence there is no automatic reconfiguration action. In an exemplary embodiment, the identified structural description change patterns can be filtered and/or ranked according to an allocated interestingness parameter in order to reduce their number and/or order them for a human operator for more efficient analysis.

In an exemplary embodiment, a temporally redundant rules filter is applied to rule change patterns (e.g. support or confidence histories) for determined association rules for the input data. This filter removes rules and associated rule change patterns from further consideration by the method and/or user which do exhibit a change pattern which can be derived by means of the change pattern of more general rules; in other words, they don't add anything to the pool of rule change patterns already available. This is achieved in an embodiment by testing the identified rule change pattern of each rule (e.g. r': XY=>Z) against the identified rule change pattern of any more general rules (e.g. r:X=>Z) for the existence of a non-trivial mapping that reconstructs the history of r' from the histories of more general rules r. Mathematically, such a reconstruction is possible when a non-trivial mapping exists that transforms the histories of more general rules into the history under consideration. In an exemplary embodiment three typical reconstruction scenarios (mappings/criterions) are specified which commonly hold in data sets. Each of the specific and general rule pairs are tested for these scenarios and if the tests are passed, then it can be said that the more specific rule can be constructed from the more general one and hence it is redundant. If there is a mapping, the rule change pattern of the more specific rule r' does not add anything and can therefore be removed from further consideration by the method and/or user. In an exemplary embodiment, statistical equivalence is determined by fitting a regression line to changes in support or confidence metrics for the specific and more general rules, and using the t-test to test for equivalent gradients and intercepts of the two regression lines, and the Pearson correlation coefficient to test for statistical equivalence.

In an exemplary embodiment, an interestingness parameter is allocated to each identified structural description change pattern using one or a combination of interestingness scores derived from corresponding statistical measures applied to the structural description change pattern (e.g. rule confidence or support history). The interestingness parameter may additionally or alternatively be derived from a user feedback mechanism which allows a user to allocate an interestingness ranking to identified change patterns. This can be used as a replacement for or to adjust any interestingness scores automatically allocated using the statistical measures. Subsequently, a similar identified change patterns can also have interestingness parameters allocated dependent on the interestingness ranking allocated to the similar change pattern. Thus, for example, the interestingness parameter of a newly identified change pattern can be adjusted or replaced by the interestingness ranking allocated to a previous similar change pattern. Various methods for determining similarity are discussed in more detail herein.

The statistical measures for each interestingness score correspond to the degree to which the respective change patterns have various statistical properties. For a trend, these properties include, but are not limited to: clarity; pronouncedness; dynamic; and homogeneity. Example statistical measures for determining these statistical properties are described in more detail herein with respect to an exemplary embodiment, although other statistical measures or methods may alternatively be used to characterise these properties. Mean and noise properties can be used for stabilities change patterns, and other statistical properties can be used to assess other change patterns such as discontinuities and spikes. For examples., the probability of a discontinuity given the history of measurements can be used, for example,. to identify highly improbable measurements (support or history) and hence very likely/interesting discontinuities.

In one exemplary embodiment, the clarity interestingness score is determined using the absolute value of the Mann-Kendall test statistic as applied to the history H (over the time periods) of a particular structural description measurement, for example, the confidence or support history of an association rule.

In one exemplary embodiment, the pronouncedness interestingness score is determined using the distance between a rule trend change pattern and the mean line of the change pattern.

In one exemplary embodiment, the dynamic interestingness score is determined the absolute value of the gradient of a regression line applied to recent values of the confidence or support history of a rule change pattern.

In one exemplary embodiment, the homogeneity interestingness score is determined using the aggregations of the distances between a rule trend change pattern and the rule change pattern of each more general rule.

As will be appreciated by those skilled in the art, various alternative known or novel statistical properties could be tested for using suitable equations or other tests in order to derive an interestingness parameter or score.

As will be appreciated by those skilled in the art, various alternative structural descriptions could be used instead of or in addition to association rule confidence or support values, for example, values representing the size, shape or position of clusters.

In an exemplary embodiment, the allocated interestingness parameter for each identified change pattern is used to filter the number of rule change patterns presented to the user or considered for matching by the method, for example, by removing from consideration those change patterns with an interestingness parameter falling below a threshold. Alternatively or additionally, the interestingness parameters can be used to rank or order the respective identified change patterns so that, for example, the most interesting or relevant (as determined by its interestingness parameter) identified change pattern is presented (e.g. displayed) to the user first. As a practical implementation will typically determine a large number (e.g. many thousands) of structural descriptions and perhaps identify an equally large number of change patterns, this embodiment can significantly reduce the burden on a human user required to interpret and/or act on this information.

In an exemplary embodiment, identifying change patterns comprises applying a trend statistical test such as the Mann-Kendall or Cox-Stuart tests to each determined structural description in order to identify any trends, and applying a stability statistical test such as the Chi-squared test to each determined pattern in order to identify any stabilities.

In an embodiment, identifying change patterns comprises applying a trend statistical test such as the Maim-Kendall or Cox-Stuart tests to each determined structural description in order to identify any trends, and applying a stability statistical test such as the Chi-squared test to each determined pattern in order to identify any stabilities.

There is also provided a system or apparatus for controlling a network using operating data for the network, the apparatus comprising: means for receiving the network operating data; means for dividing the received data into sequential time periods; means for determining a structural description for the received data in each time period; means for identifying a change pattern in the determined structural description over the time periods; and means for controlling the network using a predetermined action corresponding to a predetermined structural description change pattern in response to the identified structural description change pattern matching the predetermined structural description change pattern.

In a second aspect, the present embodiment provides a computerised method for identifying data change patterns within received data such as network operating parameters, the method comprising: receiving the temporally related data and dividing it into sequential time periods; determining structural descriptions such as association rule confidence and/or support values for the received data in each time period; identifying structural description-change patterns (e.g. rule confidence/support change patterns) in the determined structural description over the time periods; allocating an interestingness parameter to the identified structural description change patterns; and outputting identified change patterns depending on their respective interestingness parameter.

In an exemplary embodiment, the identified change patterns are only output if they have a respective interestingness parameter exceeding a threshold. Alternatively or additionally, the identified change patterns may be ranked or ordered according to the value of their respective interestingness parameters.

In an embodiment the method further comprises matching the output identified change patterns against predetermined change patterns, determining an action corresponding to a matched change pattern, and outputting a control signal dependent on the determined action.

In an exemplary embodiment, the method also comprises implementing a temporally redundant rules filter for eliminating identified change patterns based on redundant rules as mentioned above and as described in more detail below.

In some exemplary embodiments, the data represents a network operating state or comprises network operating parameters. In other embodiments, the data can represent other physical systems such as a manufacturing plant, physical entities such as high energy physics particles or drug interactions with the human body, or other types of data.

There is also provided a data processing system for identifying changes in data structural descriptions over time, the system comprising: an input for receiving temporally related data; a processor arranged to divide the received data into sequential time periods, and to determine structural descriptions such as association rule confidence or support measures for the received data in each time period; the processor further arranged to identify change patterns in the determined structural descriptions between the time periods; the processor further arranged to allocate an interestingness parameters to the identified change patterns; and an output for transmitting the identified pattern changes dependent on the respective interestingness parameters.

In an exemplary embodiment, the data comprises network operating parameters. The system may further comprise means for signalling reconfiguration instructions to the network from which the network operating parameters are received, the reconfiguration instructions being dependent on the output change patterns.

In a third aspect, the present embodiment provides a computer implemented temporally redundant rules filter for applying to rule change patterns for determined association rules for the data. The filter removes rule confidence or support histories (change patterns) which exhibit a change pattern which can be derived from the change patterns of more general rules. This is achieved in an exemplary embodiment by testing the identified rule change pattern of each rule (e.g. r': XY=>Z) against the identified rule change pattern of any more general rules (e.g. r:X=>Z) for the existence of a non-trivial mapping that reconstructs the history of r' from the histories of more general rules r. Mathematically, such a reconstruction is possible when a non-trivial mapping exists that transforms the histories of more general rules into the history under consideration. In an exemplary embodiment three typical reconstruction scenarios (mappings/criterions) are specified which commonly hold in data sets. Each of the specific and general rule pairs are tested for these scenarios and if the tests are passed, then it can be said that the more specific rule can be constructed from the more general one and hence it is redundant. If there is a mapping, the rule change pattern of the more specific rule r' does not add anything and can therefore be removed from further consideration by the method and/or user. In an exemplary embodiment, statistical equivalence is determined by fitting a regression line to changes in support or confidence metrics for the specific and more general rules, and using the t-test to test for equivalent gradients and intercepts of the two regression lines, and the Pearson correlation coefficient to test for statistical equivalence.

In an exemplary embodiment, the data represents network operating data for a network.

BRIEF DESCRIPTION OF THE DRAWINGS

Exemplary embodiments will now be described with reference to the following drawings, by way of example only and without intending to be limiting, in which.

DETAILED DESCRIPTION

Figure 1:
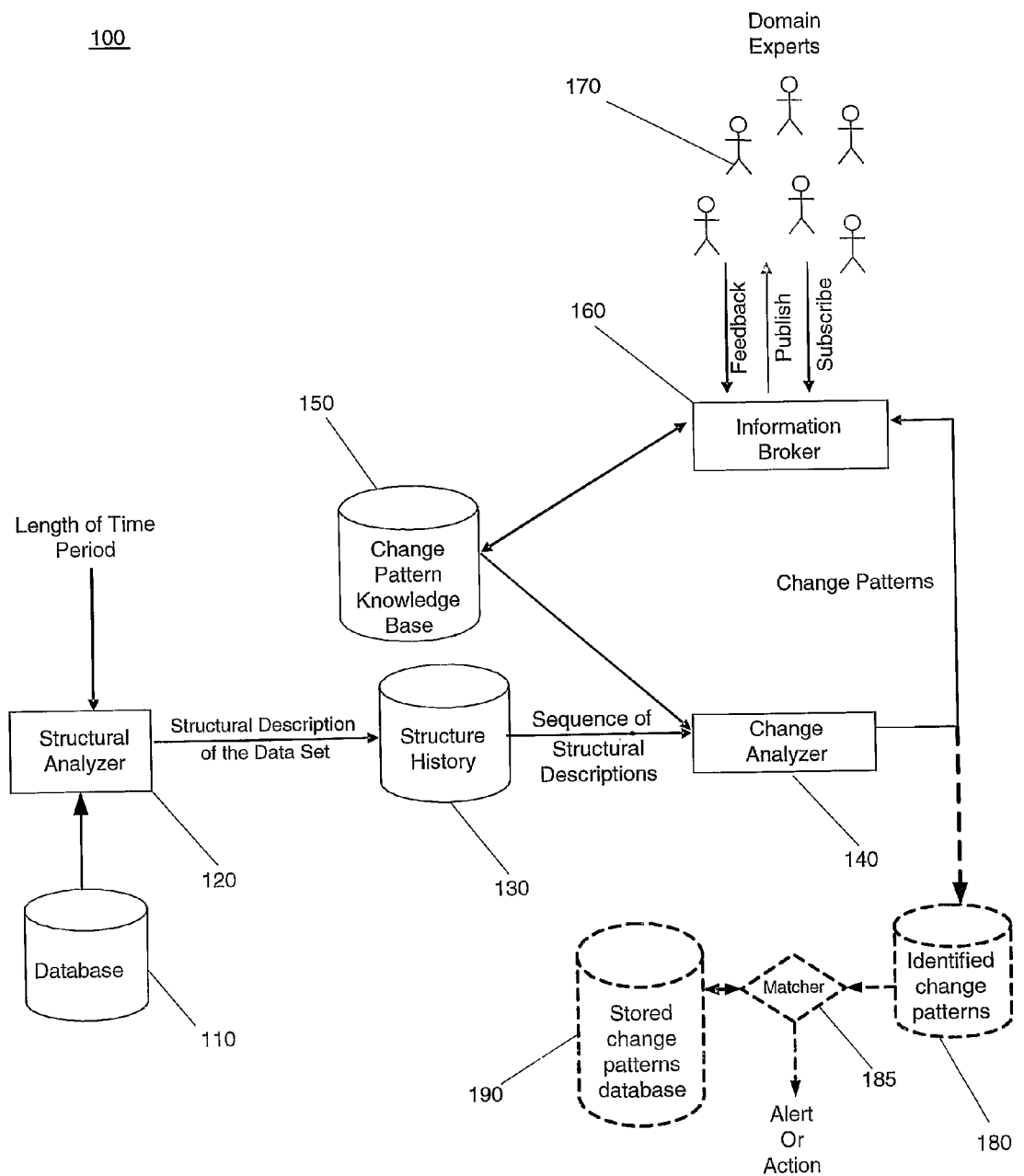
FIG. 1 shows a system according to an exemplary embodiment.

FIG. 1 illustrates a system according to an embodiment, and which may be used, for example, to monitor data and identify data change patterns relating to the operation of a communications network, a manufacturing process, or other technical data such as product reliability, pharmaceutical testing, biological and high energy physics research data. The identification of data change patterns can then be used to automatically trigger an appropriate action in the system under monitoring, such as the reconfiguration of a communications network for optimum traffic flow. Alternatively or additionally the identified data change patterns may be displayed to an operator or user such as a network administrator. The identified data change patterns may be filtered in order to reduce their number to a humanly manageable level, and/or they may be ordered according to a statistically determined interestinguess score or parameter.

The system 100 of FIG. 1 comprises a database 110 which stores the data under monitoring, for example network operating parameters such as traffic levels at each network node, dropped packet rates, and so on. The data may comprise many different types of data or parameters over time and can be stored in the database 110, or may represent real-time data feed directly from a network monitoring process for example. A structural analyser 120 divides the data into a number of consecutive time periods. The length of the time period is configurable by the system user or designer and may depend on the data used or the purposes for which the identified change patterns are used as discussed in more detail below.

The structural analyser 120 also determines patterns or structural features of the data for each time period. For example association rules and their confidence and support measures can be determined between pairs of data items (e.g. dropped packet rate at node a and traffic levels at node b) for each time period. The determined association rule confidence/support metrics, data patterns or structural features for each time period are then stored in a structure or rule history database 130. In addition or as an alternative to association rules confidence or support metrics, other data patterns, structural features or structural descriptions could be used as would be understood by those skilled in the data mining arts; example data patterns include various metrics for clusters, classifiers or function approximators like decision trees, fuzzy systems, neural networks and Bayesian networks.

The structure or rule history database 130 thus contains structural descriptions (e.g. association rule confidence and support measures) for each time period of the data. This history of structural descriptions is then analysed by a change analyser 140 which attempts to find change patterns in the structural descriptions or data patterns over the various time periods. For example if an association rule r was discovered that represented a correlation between the congestion at one network node and a fault condition at another node, any pattern of changes in that correlation r over the time periods can be determined—thus a trend (the support and/or confidence for this rule is increasing or decreasing, or has changed abruptly) or stability (the confidence and support for this rule is stable or the same over the time periods) might be discovered.

Any determined structural description change patterns for example rule confidence change patterns can then be stored in a rule change patterns database 180 and/or forwarded to a user or domain experts 170 via an information broker 160. In a large system, 100, there may be many users 170 each with their own specialty for example different users may be interested in different parts (groups of nodes) of a network's operation or different aspects of a network, e.g. network optimization or network security. The information broker 160 identifies which change patterns will be of interest to which domain expert and forwards these accordingly.

In a practical system there will typically be many thousands of association rules discovered, and perhaps a similar number of confidence and support change patterns for these rules. The size of these numbers of change patterns are impractical for a human user to assess, and so the change analyser also further processes the determined change patterns in order to reduce their number. This can be done by applying a suitable filter, and/or allocating an interestingness parameter or score to each change pattern, which can be used to eliminate those below an interestingness threshold, or to rank the change patterns found according to this interestingness parameter in order to present the most interesting or useful change patterns first.

This approach of reducing the number or ranking the change patterns can be augmented using a system of feedback from the domain experts 170, who can provide their own interestingness rating for received change patterns or confirm, accept or alter the one given by the embodiment and which is then stored in a change pattern knowledge base 150. The change analyser 140 can then use this information as an alternative or additional source for allocating interestingness parameters to similar change patterns.

The determined change patterns 180 can additionally or alternatively be compared or matched against a database of predetermined or stored change patterns 190 by a matching system 185, and some action taken if a match is found. For example if a match is found a user may be alerted to an inferred operational condition in the corresponding network, or a control signal may be provided in order to reconfigure the network in a predetermined way depending on the matched change pattern.

Figure 2:
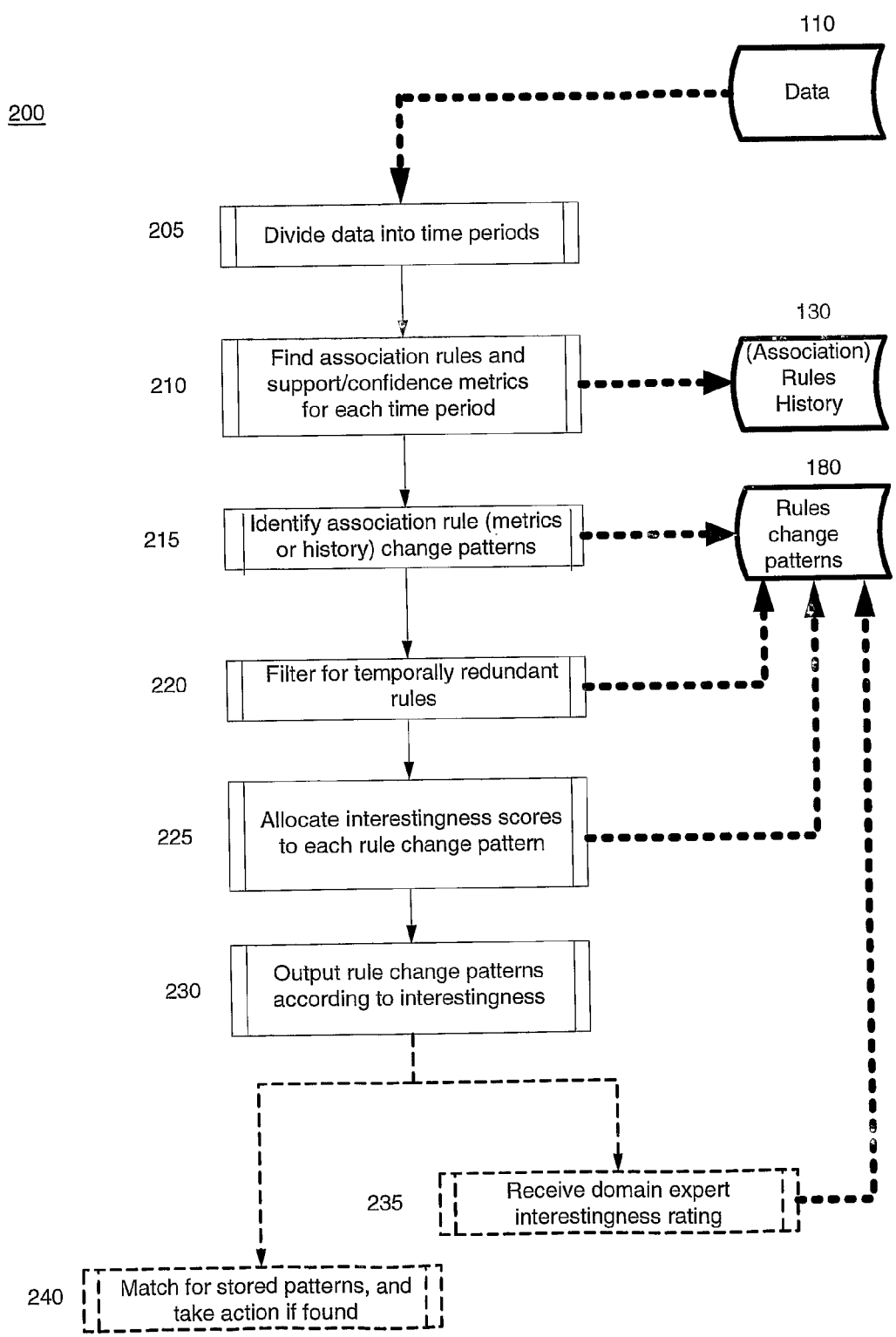
FIG. 2 illustrates a computerised method according to another exemplary embodiment.

FIG. 2 illustrates a computerised method for implementing a system similar to that of FIG. 1 and using association rule confidence and support metrics for the structural descriptions or data patterns. The use of association rule metrics is merely an example of structural descriptions or data patterns and is used here for clarity of description of this embodiment; however the skilled person will appreciate that other structural descriptions could be substituted. The method (200) uses databases similar to those in FIG. 1 and for simplicity the same reference numerals are used, however the structural history database 130 is hereafter referred to as the (association) rule history database, and the change patterns database 180 is referred to as the rule changes database.

As noted previously the data (network operating parameters) are received from a database 110 or real-time data feed and are divided into time periods (205). In configuring the length of the time periods, two aspects are considered: on the one hand long periods lead to many transactions in the individual data sets for the different periods and thus can enhance the reliability of the association rule's support and confidence (or other) metrics. On the other hand, short periods allow to measure a rule's statistics more frequently, which may lead to a more reliable detection of change patterns. The particular time period chosen for a given implementation will depend on many factors such as the domain, number of attributes and records of the data set as would be appreciated by those skilled in the art.

The method (200) then determines association rules for each time period (210), and these rules are stored in the (association) rules history database 130 together with various metrics describing the strength or other factors relating to the discovered association rules such as their confidence and support metrics. The goal of association mining is to detect all those data items which frequently occur together and to form rules which predict their co-occurrence. Thus association rule mining discovers the exhaustive set of all hidden associations or correlations between data items in a set of data, and typically represents these in terms of confidence and support. An association rule r is an expression X=>Y where X and Y are itemsets (sets of common data items e.g. X=packet drop rate at node x and Y=packet transfer rate at node y). It means that given a dataset D (a time period Ti of the data from the database 110), whenever X appears in a data transaction T (e.g. database record), then Y is likely to appear in the same data transaction. The predictive ability of a rule r: X=>Y is measured by its confidence conf(r) which is defined as:

$$conf(r) := \frac{|\{T \in \mathcal{D} \mid \mathcal{X} \cup \mathcal{Y} \subseteq T\}|}{|\{T \in \mathcal{D} \mid \mathcal{X} \subseteq T\}|}$$

The significance or relative frequency of the rule r: X=>Y is measured by its support supp(r) which is defined as:

$$supp(r) := \frac{|\{T \in \mathcal{D} \mid \mathcal{X} \cup \mathcal{Y} \subseteq T\}|}{|\mathcal{D}|}$$

Alternative or additional association rule (or other structural description) metrics may be used in alternative embodiments. Association rules will be well known to those skilled in the data mining arts, and their general derivation is not further discussed here; however more detailed information can be found for example in Agrawal, R., Imielinski, T., and Swami, A. (1993), "Mining association rules between sets of items in large databases", In Proceedings of the ACM SIGMOD International Conference on Management of Data, pages 207-216, Washington D.C.

In an embodiment the data represents network operating parameters and the derivation of rule metrics identifies correlations between these parameters. A simplified example is given below for a single node in a network. Table 1 shows a series of transactions (records or rows) in a dataset for the node.

TABLE 1

| T1 | Traffic = low  | Delay = low  |           | Users = 5-10 |
|----|----------------|--------------|-----------|--------------|
| T2 | Traffic = high | Delay = high | Node_down | Users = 1-4  |
| T3 | Traffic = low  | Delay = high |           | Users = 5-10 |
| T4 | Traffic = high | Delay = high |           | Users = 1-4  |
| .  |                |              |           |              |
| .  |                |              |           |              |
| .  |                |              |           |              |
| Tn |                |              |           |              |

Each transaction contains a set of items (itemset), and corresponds to a network measurement time such that the transactions represent network measurements 1 minute apart. Each item corresponds to a particular measurement or attribute (e.g. Traffic levels) together with a value (e.g. low or high). An itemset is a set of attribute-value pairs, for example {traffic=low, delay=low, users=5-10} which in this case corresponds to transaction T1. Table 1 can also be written in a binary format as shown in Table 2 below:

TABLE 2

| Transaction | Traffic = Low | Traffic = High | Delay = Low | Delay = High | Node OK | Node Down | Users = 1-4 | Users = 5-10 |
|---|---|---|---|---|---|---|---|---|
| T1 | 0 | 1 | 1 | 0 | 1 | 0 | 0 | 1 |
| T2 | 1 | 0 | 0 | 1 | 0 | 1 | 1 | 0 |
| T3 | 0 | 1 | 0 | 1 | 1 | 0 | 0 | 1 |
| T4 | 1 | 0 | 0 | 1 | 1 | 0 | 1 | 0 |

Using association rule learning, the following rules can be derived:

Traffic=High=>Delay=High
Node_OK, User=5-10=>Traffic=Low

Both rules have a support of 2/4=0.5 and a confidence of 2/2=1.

The second rule can be written as X=>Y, where X is the itemset {Node_OK, User=5-10} and Y is the itemset {Traffic=Low}. The support measure can also be applied to itemsets within a rule, so that for example supp(traffic=high)=2/4=0.5 or supp(node_OK, user=5-10)=2/4=0.5. This itemset support measure is used for some statistical measures applied to the corresponding rule as described in more detail below.

After association rules r and their descriptive metrics have been determined for each time period Ti, the method (200) then identifies association rule change patterns across the time periods (215) using the descriptive metrics (support/confidence) histories in the rule history database 130. Examples of identified change patterns include: stabilities where the support supp(r) and confidence conf(r) of a rule r remains statistically constant over the different time periods Ti of the data; upward trends where the confidence and/or support of a rule increase over the time periods; downward trends; spikes or other discontinuities in support and/or confidence. Many other change patterns may exist and within the change patterns mentioned above various features may vary from one change pattern to another. For example an upward trend may have a constant gradient or may be rapidly and exponentially increasing for example. Algorithms identifying the change patterns are described in more detail with respect to FIG. 4. Identified rule change patterns such as a trend in one rule's support or a stability in another rule's confidence are added to a rule change database 180.

In order to reduce the number of identified change patterns which have to be dealt with, the method may include a temporally redundant rules filter algorithm (220) which identifies rules in the rules history database 130 which are redundant. Any rule change patterns based on those redundant rules can then be removed from further consideration by the method (200), which reduces the amount of computational processing required and improves the user interface by reducing the amount of (uninteresting) information presented. An embodiment of a redundant rules filter is described with respect to FIG. 7, in which derivative rules are identified. Derivative rules are rules which can be derived from or explained by other more general rules such that the more specific rule adds nothing further to the set of rules in terms of rule change patterns. For example if a rule r identifies an association or correlation between broadband use and high internet use, then a more specific rule r' which identifies broadband use by men over 50 with high internet use but which is characterised by (apart from scaling) statistically equivalent confidence or support measures means that the inclusion of the item men over 50 adds nothing to knowledge about change patterns in the data. Thus this more specific rule r' is redundant because it can be explained by the more general rule r. If however the history of support and/or confidence for a rule linking broadband and high internet use was significantly different for men over 50 than for the population as a whole, then this could not be explained by the more general rule, and this more specific rule r' would not be redundant and hence its associated rule change pattern would not be filtered or removed from further consideration.

The method may also allocate an interestingness score or parameter to each identified (optionally after redundant rule filtering) rule change pattern (225) such as a rule confidence trend or a rule support spike. The interestinguess parameter comprises one or a combination of statistic measures applied to the respective rule change pattern. An embodiment of this is described in more detail with respect to FIG. 6, however an example is the Mann-Kendall statistical measure as an interestinguess score for clarity. Various scores can be combined in various configurable ways in order to generate a combined interestingness score or interestinguess parameter which is then stored with the corresponding rule change pattern in the rule change database 180.

The interestingness parameter may additionally or alternatively be generated using a user feedback mechanism which stores interestingness ratings allocated to previous rule change patterns by users of the method (200). Alternatively or additionally the fed-back interestingness ratings may be used to confirm, alter, or reject the above described statistically derived interestingness score allocations. Similar rule change patterns can then be allocated the same interestingness parameter, or a component of this when other statistical measures are also used.

Once the interestingness scores or parameters have been allocated to the rule change patterns, the method (200) then outputs the rule change patterns according to or depending on their respective interestingness parameter (230). In an embodiment, only rule change patterns exceeding an interestingness parameter threshold may be outputted, for example displayed to a user. In addition or alternatively the rule change patterns may be output in an order according to their, interestingness parameter with those having the highest interestingness parameter output first. This allows a user to concentrate on the most interesting rule change patterns first and/or only.

The embodiment can therefore provide an assumption free, pro-active analysis of data based on pattern change. In other words patterns and associated rules do not need to be specified in advance, but rather the method identifies non-predetermined change patterns of any associations, correlations or rules relating to the whole data set and measures the degree (interestingness score) to which these change patterns exhibit predetermined properties like stability, non-rapid change, homogeneity and so on; and combines those degrees into an interestingness measure or parameter which can be used to flag-up interesting patterns. Measurement of the degrees or extent of the predetermined properties is done using statistical tools, equations or measures applied to the change patterns. This approach allows the system to automatically identify interesting change patterns in the data which may be completely unexpected to a user of the system, for example a developing instability in a network. This allows the user to take pro-active remedial action in order to prevent the instability from shutting down the network, rather than taking corrective action only after this has occurred.

The rule change patterns may be output to different users or domain experts depending on which rules the patterns relate to for example. The domain experts may then provide an interestingness rating for the patterns which they are shown which is received by the method (235) and incorporated into the respective rule change pattern entry in the rule change database 180. The outputted rule change patterns may additionally or alternatively be compared against stored or predetermined rule change patterns to identify any matches (240). If a match is found (i.e. an identified rule change pattern is similar to a predetermined rule change pattern) then some action is automatically taken. This may simply be alerting an operator or domain expert to the identified rule change pattern, or controlling a system such as a network associated with the data.

Figure 3:
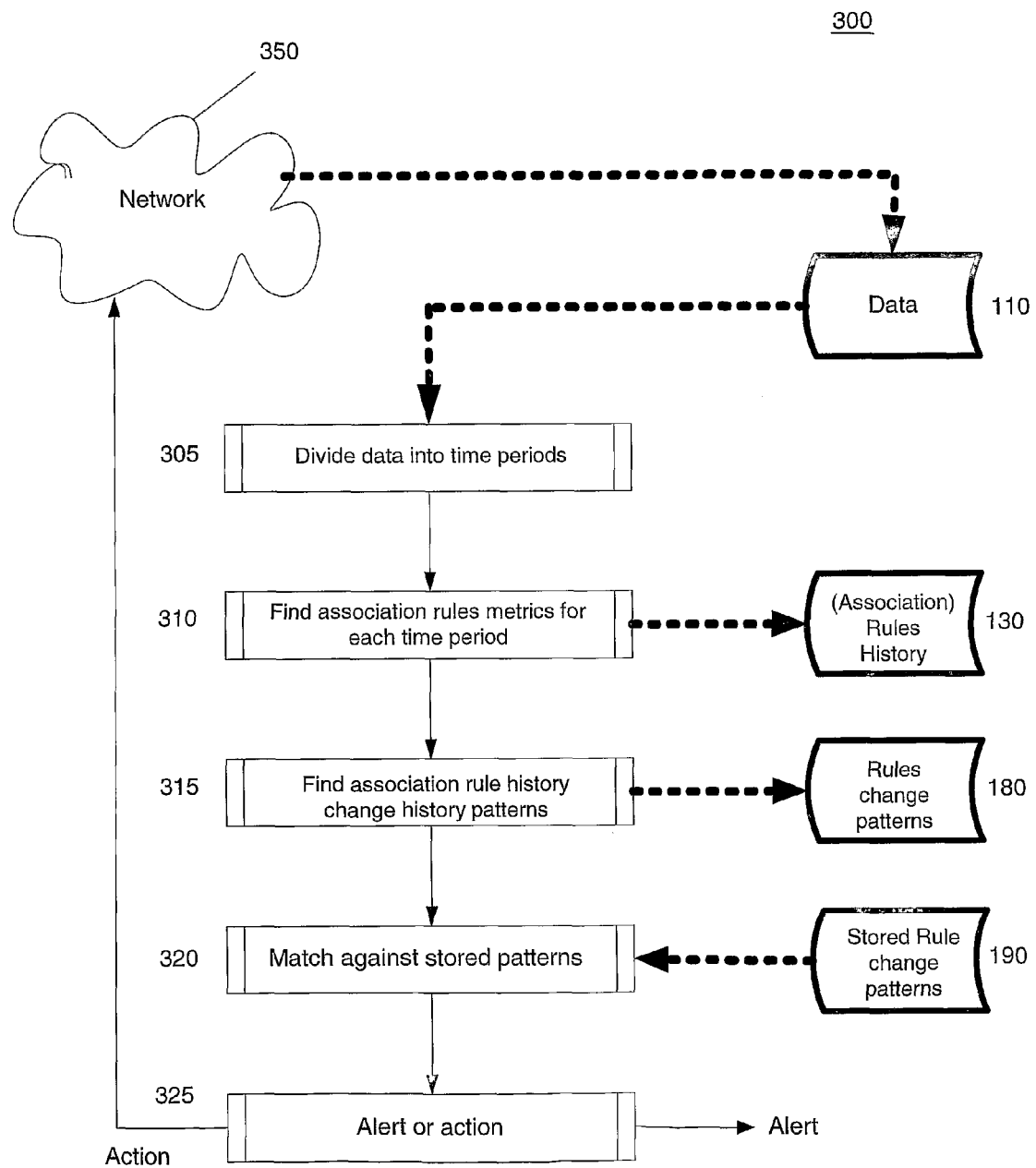
FIG. 3 illustrates a computerised method according to another exemplary embodiment.

FIG. 3 illustrates an alternative embodiment in which network 350 is monitored by a monitoring system implemented by the method (300) shown. Network parameters such as the traffic levels at each network node are provided to the method (300), which receives the data in real-time and divides it up into time periods (305). The method (300) then determines association rules for the data in each time period (310), and adds this to a rule history database 130. This is similar to method step (210) of FIG. 2, and can also be implemented by the algorithm described with respect to FIG. 4. The method (300) then identifies rule change patterns (315), and adds these to a rule change patterns database 180. The algorithm described with respect to FIG. 5 may be used to implement this step.

The identified rule change patterns and their corresponding rules are then compared against predetermined or stored rule and rule change patterns pairs (320) from a stored rule change pattern database 190. The stored rule and rule change pattern pairs are each paired or associated with one or more actions which the method or system automatically takes upon identifying a match. If the rule in the stored pair is equal to or more specific than the rule in the identified rule change pattern and the two corresponding rule change patterns are found to be similar, then the paired action is taken (325). Change pattern similarity can be defined in various ways for example both change patterns contain a common feature such as a trend with a certain slope. Example actions include alerting a user for example the network operator, or reconfiguring the network in a predetermined way. This allows for more sophisticated monitoring and/or control of the network, compared with monitoring single operating parameters (i.e. rules rather than rule change patterns) alone. The embodiment also allows automatic detection of causes for changes in network parameters based on the rule condition and to search for correlations (and hence possible unexpected cause-and-effect relationships) between network events.

Example identified change patterns and corresponding actions in a network implementation include:

Rule: Low utilisation of proxy X1->high network latency for subnet B1

Change Pattern The confidence of the rule exhibits an upward trend

Action: Reconfigure proxy scripts in B1 such that more traffic is routed via X1

Explanation: The above rule and its change pattern can be interpreted such that the current proxy configuration becomes ineffective due to a change in the network usage pattern in subnet B1. The infectivity is observed by means of an increasing probability of high latencies whenever X1 is under-utilised. Consequently, an automatic reconfiguration of the proxy settings can be triggered.

Rule: PC has low number of incoming e-mails->PC has high number of outgoing e-mails Change Pattern The support of this rule shows a sudden increase compared to what is expected by its history Action: Take all computers to which the rule applies from the network because they might be infected with a Trojan (spam email sender). The sudden increase in support indicates that the network just has been infected.

Explanation: Typically there would only be a small number of PCs that receive a small number of e-mails but send a large number of e-mails. Normally, PCs have a similar number of incoming and outgoing e-mails. That means the above-mentioned rule would typically have a very small support.

In more sophisticated implementations, instead of identifying single rule change pattern matches and taking a corresponding action(s), the method (300) may be configured to try to identify groups of matching rule change patterns and take a number of measures or actions related to the discovery of that particular rule change pattern.

Figure 4:
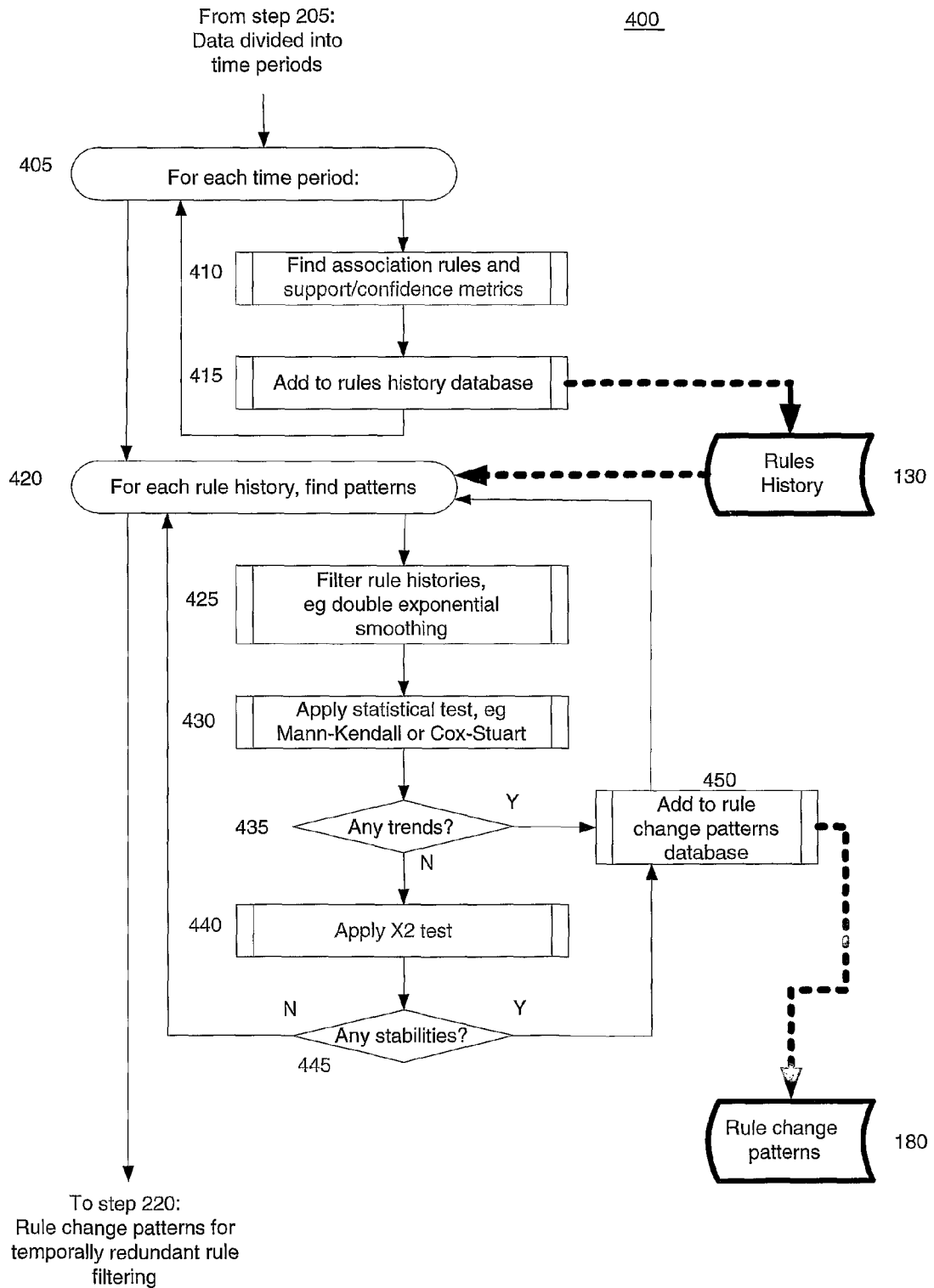
FIG. 4 illustrates an algorithm of determining association rule change patterns for the methods of FIGS. 2 and 3.

FIG. 4 illustrates the steps of determining association rules in each time period Ti and identifying rule change patterns in these time periods over the entire time T1-Tn (or at least two or more time periods) of the data—this corresponds to steps (210) and (215) in FIG. 2. The method (400) initially processes each time period serially (405), and determines association rules within each time period (410). As discussed previously, association rules and methods for obtaining them will be well known to those skilled in the art. For each time period, the determined association rules are added to a rules history database 130 which stores the association rules found for each time period together with descriptive metrics such as their confidence and support values (415). After the association rules for each time period Ti have been found, the method (400) then attempts to identify change patterns in the metrics (e.g. confidence/support) of common rules r1-rm over the course of the time periods T1-Tn. Thus taking each rule in turn, the method takes the confidence and support levels for that rule over each of the time periods (420). The system treats confidence and support (and any other rule or other structural description metrics used) separately, such that a rule can have different change patterns each relating to a different measure.

The history of the support or confidence of each rule may be filtered in order to remove noisy data (425). A typical data noise filter algorithm is double exponential smoothing which will be known to those skilled in the art, though other data noise filtering algorithms could alternatively be used. After filtering if used, the method then determines whether a trend exists in the current rule confidence or support history (430). To do this a statistical test is applied to the confidence and support measures of the rule over the time periods. Example tests include the Mann-Kendall test and the Cox-Stuart test, both of which will be well known to those skilled in the statistical arts. These tests generate a measure or value, which is compared with a threshold value in order to determine whether a trend exists in the rule data (435). If the obtained measure exceeds the threshold (435Y), the trend or pattern is added to the rule change patterns database 180 (450). The method then returns to test the next rule or rule metric (420). If no trend is found (435N), then the method determines whether a stability exists in the confidence and support for the rule over the time periods, in other words they remain statistically constant (440). Again a statistical test is used to identify any stabilities, for example the $Chi^2$ or $X^2$ test which will be well known to those skilled in the statistical arts. Again the test generates a measure which can be compared against a threshold in order to identify a stability (445). If no stabilities are detected (445N), then the method returns to test the next rule or rule metric (420). If however a stability is detected (445Y), the method adds this to the rule change pattern database (450), and returns to test the next rule or rule metric (420). Embodiments can be adapted to detect other rule change patterns, for example spikes and discontinuities. Various methods for detecting these will be apparent to those skilled in the art, for example discontinuities can be detected by estimating the probability distribution of the next support or confidence value in a history based on the previous values. If the actual value is then rather unlikely given that probability distribution the change pattern is flagged as a discontinuity.

Figure 5:
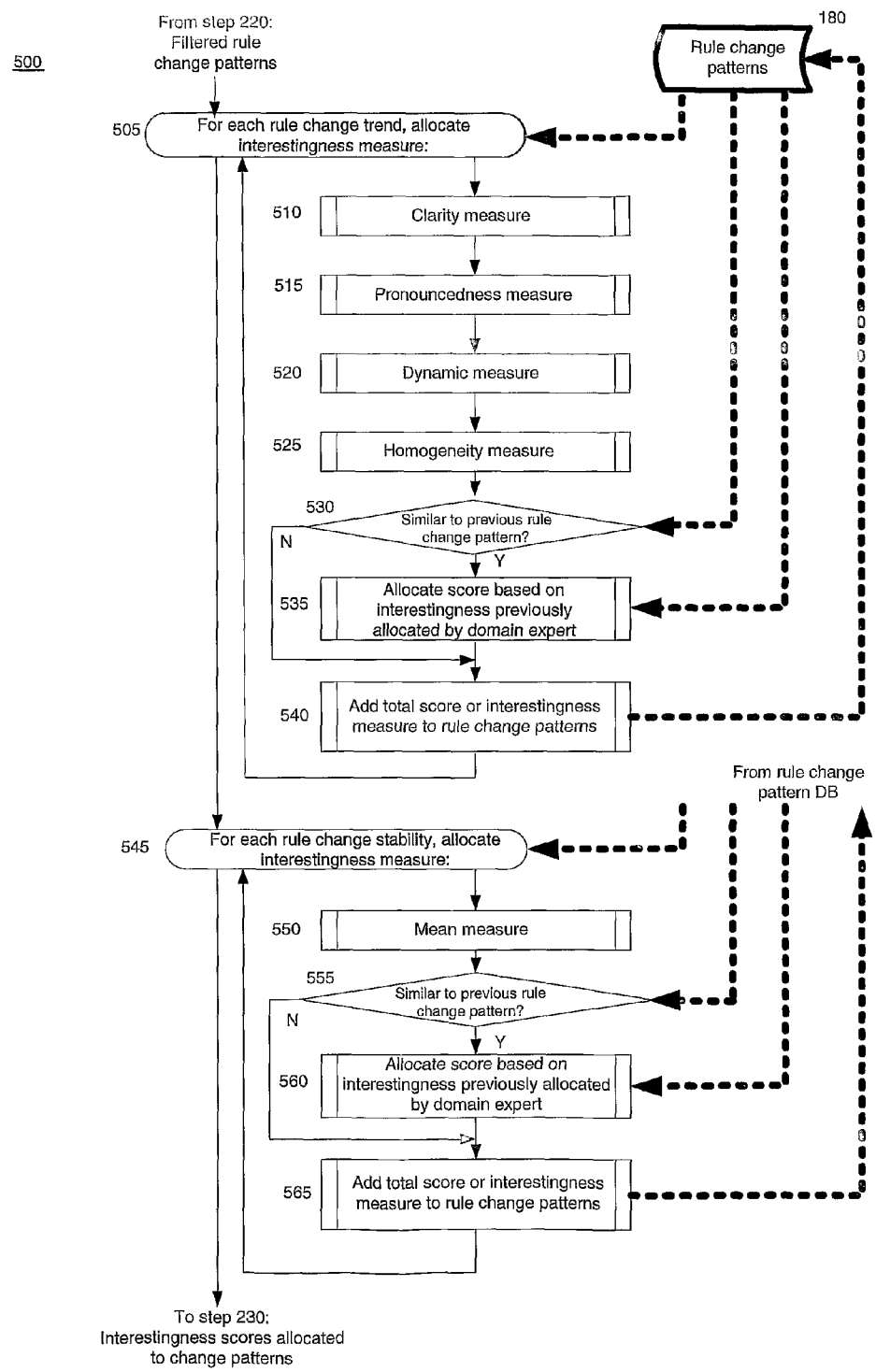
FIG. 5 illustrates an algorithm for allocating interestingness parameters to rule change patterns for the method of FIG. 2.

Referring now to FIG. 5, this illustrates an algorithm or method for allocating interestinguess parameters or scores to each rule change pattern (e.g. trend or stability). The method (500) first processes all trend rule change patterns one at a time (505). The current rule change pattern is first assessed for a clarity score or measure (510). This metric assesses the clarity of a detected trend and thus the certainty that it indeed exists. Maximum clarity is reached for an upward trend if each value is greater than its predecessor and for a downward trend if each value is smaller than its predecessor. The test statistics for the Mann-Kendall and the Cox-Stuart test both provide a suitable basis for assessing a trend's clarity. However, the range of the Cox-Stuart test statistic's possible values is significantly smaller than those of the Mann-Kendall test. Particularly for short histories this leads to a very coarse ranking, with the same value assigned to many histories. The Mann-Kendall test statistic, on the other hand, does not have this disadvantage and so it is incorporated into a clarity measure in this embodiment. Other statistical measures could also be used for the clarity metric as will be appreciated by those skilled in the art. Where C denotes the Mann-Kendall test statistic for the history H of rule confidence or support measures for the current rule change pattern, the clarity vclarity of the trend is defined as:

$$\psi \text{clarity}(H) := |C|$$

or the absolute value of the statistical measure.

The current rule change pattern is then assessed for a pronouncedness score or measure (515). This metric assesses both the stability and the non-rapid change of the trend, and in this context means the deviation of a trend from stability which in turn can be described by the mean line. Given a history $H=(v1, \ldots, vn)$ which is a support or confidence history, as these are relative measures, the histories for all the rule change patterns are scaled such that on the one hand they have the same mean level but on the other hand all relative changes are preserved—this gives a scaled sequence $(v1', \ldots, vn1)$ where $v_i'$ can be derived from:

$$v_i' = \frac{v_i}{\sum_{i=1}^{n} v_i}$$

One method to assess the pronouncedness of a trend in the history H is to calculate the distance between the transformed sequence above and the mean line sequence. The mean line of the transformed sequence is described pointwise by the sequence $(1/n, \ldots, 1/n)$. A first pronouncedness measure can be determined from the following equation:

$$\psi_{pron1}(H) := \sum_{i=1}^{n} \left| v_i' - \frac{1}{n} \right|$$

Any other norm to measure the distance could be used as well.

If the sequence H is a support history the probabilistic meaning of the support can be utilised to derive an alternative pronouncedness measure using information theory. Let X be an itemset and supp(X, Ti) its support in each period Ti, $i=1, \ldots, n$. The itemset X is the union of the itemsets in the current rule r, so for example for a given a rule $r:Y \Rightarrow Z$ the itemset X is the union of the itemsets Y and Z, i.e. it's the itemset of the underlying rule r. The support supp(X, Ti) of the itemset X is used in determining the pronouncedness measure or score because this support neither takes the direction of the implication nor each single itemset in the rule r condition and consequence into account. In other words, using this support measure is more general than one solely based on the corresponding rule r. The support is an estimate for the probability that a data transaction supports X in period Ti, or supp(X, Ti)$\approx$P(X|Ti). Using Bayes' rule this can be rewritten as:

$$P(T_i \mid X) = \frac{P(X \mid T_i) P(T_i)}{P(X)}$$

The left side can be interpreted as the probability that a randomly drawn transaction, of which it is known that it supports X, has been generated in period Ti. In case that the history H is perfectly stable P(X|Ti)=P(X) holds and consequently is P(Ti|X)=P(Ti). This means that the information that a transaction supports X provides no additional knowledge about the period to which the transaction belongs. Given an arbitrary support history with a trend for an itemset X, P(Ti|X)=P(Ti) can be used to derive a pronouncedness measure by comparing the a posteriori distribution P(T|X) with the a priori distribution P(T). A well-known and broadly used measure to compare two distributions is relative entropy, also called the Kullback-Leibler distance. The relative entropy can be considered as a sort of distance between two probability distributions. Using the relative entropy, the following pronouncedness measure can be defined:

$$\psi_{pron2}(H) := \sum_{i=1}^{n} P(T_i \mid X) \log_2 \frac{P(T_i \mid X)}{P(T_i)}$$

This measures the average number of additional bits necessary to encode the period T if the coding is based on the stability assumption, compared to a coding based on the true distribution P(T|X) induced by the trend.

After obtaining a pronouncedness score using either of the two equations above, the method (500) then obtains a dynamic score or measure (520). The dynamic of a trend is related to its rate of incline or decline, and the measure assesses the trend's non-rapid change property. Unlike pronouncedness however, it measures the change rate only for the most recent values of a history, and thus is more interested in how the rules are evolving, rather than how they performed in the past. Let $H=(v1, \ldots, vn)$ be a history, which as described above is scaled—$(v'1, \ldots, v'n)$. To assess the dynamic of a trend only the last n' values are considered. A linear regression line is fitted to them, where the time is the independent variable. Let m denote the slope of the obtained regression line; the dynamic interestingness measure is then defined as:

$$\psi dyn(H) := |m|$$

or the absolute value of the slope of the fitted regression line. Alternatively, the slope of the secant passing through the points v'n and v'n–h can be used –n' will typically be at least 5.

Particular combinations of these metrics may additionally be configured to influence the overall interestingness parameter. For example, a history which has a high pronouncedness but a low dynamic is likely to have rapidly in- or declined in the past but is now stabilising. In contrast, a rule with a low pronouncedness but a high dynamic may hint at a current rapid increase in the trend's change rate. Other combinations of the statistical measures or abstract properties of a change pattern may also signify more interesting implications which can be reflected by adjusting the interestingness parameter(or individual interestingness scores).

After obtaining a dynamic score using the equation above, the method (500) then obtains a homogeneity score or measure (525). This measure or test is focused on subpopulations which change differently than the population to which they belong, rather than in the information that a population has subsets which change differently. Transferred to support and confidence histories H(r') for a rule r' this means that they should be compared to the corresponding support or confidence histories H(r) of each more general rule r in order to detect inconsistencies with a homogeneity assumption. Let R'(r) be the set of all rules r> r' with exactly one item less in their antecedent whose histories H(r) contain a change pattern—where r> r' means r is a generalisation of r'. Where R'(r) is the empty set, the rule r' can be ignored. To assess the interestingness of a rule in terms of its homogeneity, a two step approach is used. In the first step, the deviation of H(r) from H(r') is calculated for each r'∈R'(r) as defined below. In the second step the obtained deviations are aggregated into a single value.

Step 1. Calculating the deviation between two histories H(r) and H(r') is an apparent extension of the methods for pronouncedness assessment, where the history of a more general rule r replaces the mean line. As before two deviation measures are introduced of which one is a heuristic but applicable to every history, whereas the other is based on information theory but restricted to support histories. Both derivations are similar to those used for pronouncedness and are therefore only briefly outlined in the following. Let H(r)= (v1, . . . , vn) and H(r')=(w1, . . . , wn) be the support or confidence histories of the rules r and r' with r'∈R'(r). Both histories are scaled yielding sequences (v'1, . . . , v'n) and (w'1, . . . , w'n). The deviation between H(r) and H(r') is then defined as:

$$\phi_{heuristic}(H_m(r), H_m(r')) := \sum_{i=1}^{n} |v'_i - w'_i|$$

Any other norm can be used as well. Under the restriction that both H(r) and H(r') are support histories a deviation measure based on information theory can be derived. Let X and Xy be the corresponding itemsets of r and r', respectively, with supports supp(X, Ti)≈P(X|Ti) and supp(Xy, Ti)≈P(Xy|Ti) in each period Ti. Here y is a single item, and Xy is the union of the itemset X with the itemset {y}. Thus the itemset Xy is more specific than X. In terms of rules r and r' this could be r': Wy=>Z and r: W=>Z. Itemset X is then the union of the itemsets W and Z. Applying Bayes' rule yields the probabilities:

$$P(T_i \mid X) = \frac{P(X \mid T_i)P(T_i)}{P(X)}$$

$$P(T_i \mid Xy) = \frac{P(Xy \mid T_i)P(T_i)}{P(Xy)}$$

If the homogeneity assumption holds it is $$\frac{P(T_i \mid Xy)}{P(T_i \mid X)} = \frac{P(T_j \mid Xy)}{P(T_j \mid X)} \text{ for any } T_i, T_j \in \hat{T}$$

and it follows that $$P(T_i|X) = P(T_i|X_y) \text{ for any } T_i \in \hat{T}$$

This means that if the homogeneity assumption holds (i.e. the change pattern under consideration is homogeneous), the information that a transaction supports {y} in addition to X gives no additional knowledge about the period to which the transaction belongs. Proof:

$$\begin{aligned} P(T_i \mid Xy) &= \frac{P(Xy \mid T_i)P(T_i)}{P(Xy)} \\ &= \frac{P(Xy \mid T_i)P(T_i)}{\sum_{j=1}^{n} P(Xy \mid T_j)P(T_j)} \\ &= \frac{P(X \mid T_i)P(Xy \mid T_i)P(T_i)}{P(Xy \mid T_i)\sum_{j=1}^{n} P(X \mid T_j)P(T_j)} \\ &= \frac{P(X \mid T_i)P(T_i)}{P(X)} \\ &= P(T_i \mid X) \end{aligned}$$

Given support histories for the itemsets Xy and X, $P(T_i|X)=P(T_i|Xy)$ for any $T_i \in \hat{T}$ can be used to derive a deviation measure by comparing the distribution P(T|Xy) with P(T|X). As with the pronouncedness measure the relative entropy is utilised yielding the following deviation measure:

$$\phi_{entropy}(H_m(r), H_m(r')) := \sum_{i=1}^{n} P(T_i \mid Xy) \log_2 \frac{P(T_i \mid Xy)}{P(T_i \mid X)}$$

From an information theoretic perspective this measures the average number of additional bits necessary to encode the period T if the coding is based—according to the homogeneity assumption—on the distribution P(T|X), compared to a coding based on the true distribution P(T|Xy). Only if the homogeneity assumption holds the measure takes on its minimal value, i.e. φentropy=0. If not, the non-zero value of the deviation measure can be used as a component in the interestingness score.

Step 2. After each r'∈R'(r), the deviation of its history to the one of r has been calculated, the resulting set Φ(r):={φ(H(r), H(r')): r'∈R'} is aggregated to the final homogeneity interestingness measure:

$$\psi homogeneity(H(r)) = agg(\Phi(r))$$

Figure 9:
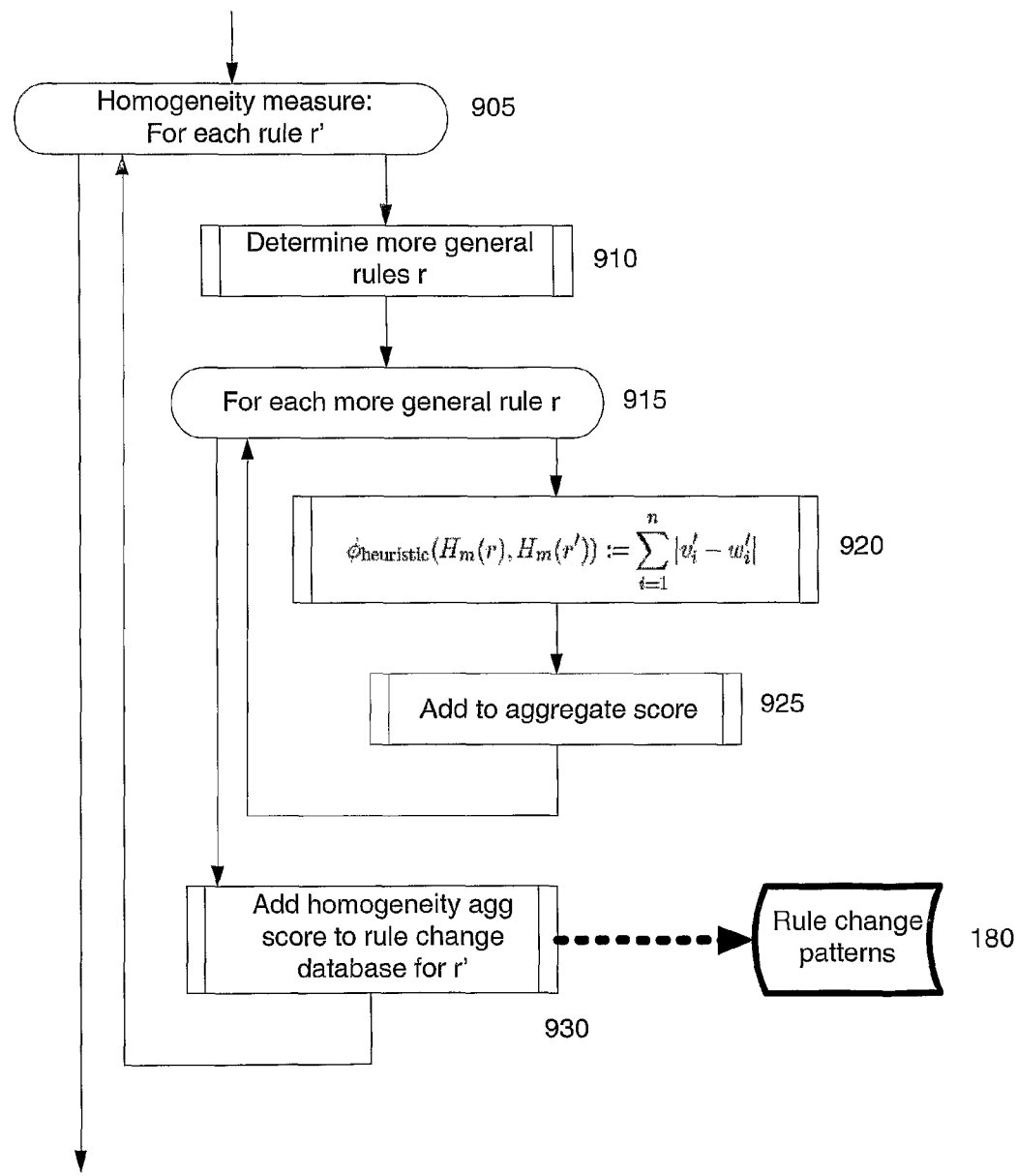
FIG. 9 illustrates an algorithm for determining a homogeneity score for each rule.

FIG. 9 illustrates an algorithm for implementing the homogeneity scoring. Similar algorithms could be used for implementing the clarity, pronouncedness, and dynamic scoring as would be understood by those skilled in the art. The homogeneity algorithm or method (900) determines each rule r' which has an identified rule change pattern (905), and for each of these rules r' determines all the more general rules r (910). This may be achieved by simply comparing the itemsets in the current rule r' with all the itemsets in the rules of the identified rule change patterns, or by building a suitable rule relationship graph as would be understood by those skilled in the statistical arts. Then for each more general rule r for the current (more specific) rule r' (915), the method determines the deviation measure $\Phi$ between the two support or confidence histories of the two rules r and r' (920). This deviation measure is added to an aggregate score (925), such that after all the general rules r for the current rule r' have been tested, the homogeneity score $\Psi$homogeneity can be obtained from the aggregate score and added to the rule change pattern database 180 associated with the rule change pattern for the current rule r' (930). The next rule r' is then tested (905).

Once the clarity, pronouncedness, dynamic, and homogeneity measures for a rule history, the method (500) determines whether the current rule change pattern is similar to a previously rated rule change pattern (530). A number of previous rule change patterns may have been assessed and rated for interestingness by users of the system, so called domain experts. The current or identified rule change pattern is compared against these previously rated rule change patterns to determine whether it is sufficiently similar to any of these previously rated rule change patterns in the rule change database 180 as described above. Firstly the rules are matched (the same or more general), then the corresponding rule change patterns are checked for similarity or equivalence. Various techniques for determining pattern equivalence (or recognition) will be known to those skilled in the art. For example and two patterns may be represented in binary vector form, in which it is determined whether each pattern has a number of properties (1) or not (0). In general any feature of a time series can be used as a suitable property. The two binary vectors are then compared, for example the cosine of the angle between them is determined and compared against a threshold. If the current rule change pattern is judged to be similar to a previously rated rule change pattern (530Y), a further interestingness score is allocated to the current rule change pattern or its combined interestingness score is adjusted based on the interestingness rating of the similar rule change pattern (535). The various scores or measures—clarity, pronouncedness, dynamic, homogeneity, rating of similar pattern—are then combined for example by simply adding, and a combined interestingness score or parameter is generated (540) which is stored in the rule change database 180 associated with the current rule change pattern.

Various alternative arrangements are possible, for example only one of the described measures or scores may be used to generate the interestingness parameter, or different statistical measures may be used. The interestingness rating based on a similar pattern may be multiplied to the summed statistical measures, or various other ways of combining these measures may be used. A further embodiment for using the interestingness feedback rating to confirm, adjust, or reject the statistical measure based interestingness parameter is described further below.

The method (500) then allocates interestingness parameters for each stability or stable rule change pattern (545). The mean value of each stability or rule change pattern is determined (550) and used as an interestingness score. As with the trend patterns, the stabilities can be compared against similar previously rated stabilities—that is stabilities with a similar mean value and other parameters such as the rules on which the stabilities are based or their noise levels (555). If a similar stability is found (555Y), its interestingness rating is added to the mean measure or score (560) or is used to adjust that score in some way. The method then generates an interestingness parameter from the mean score and/or similar pattern rating and stores this in the rule change database with the rule change pattern (565).

Figure 6:
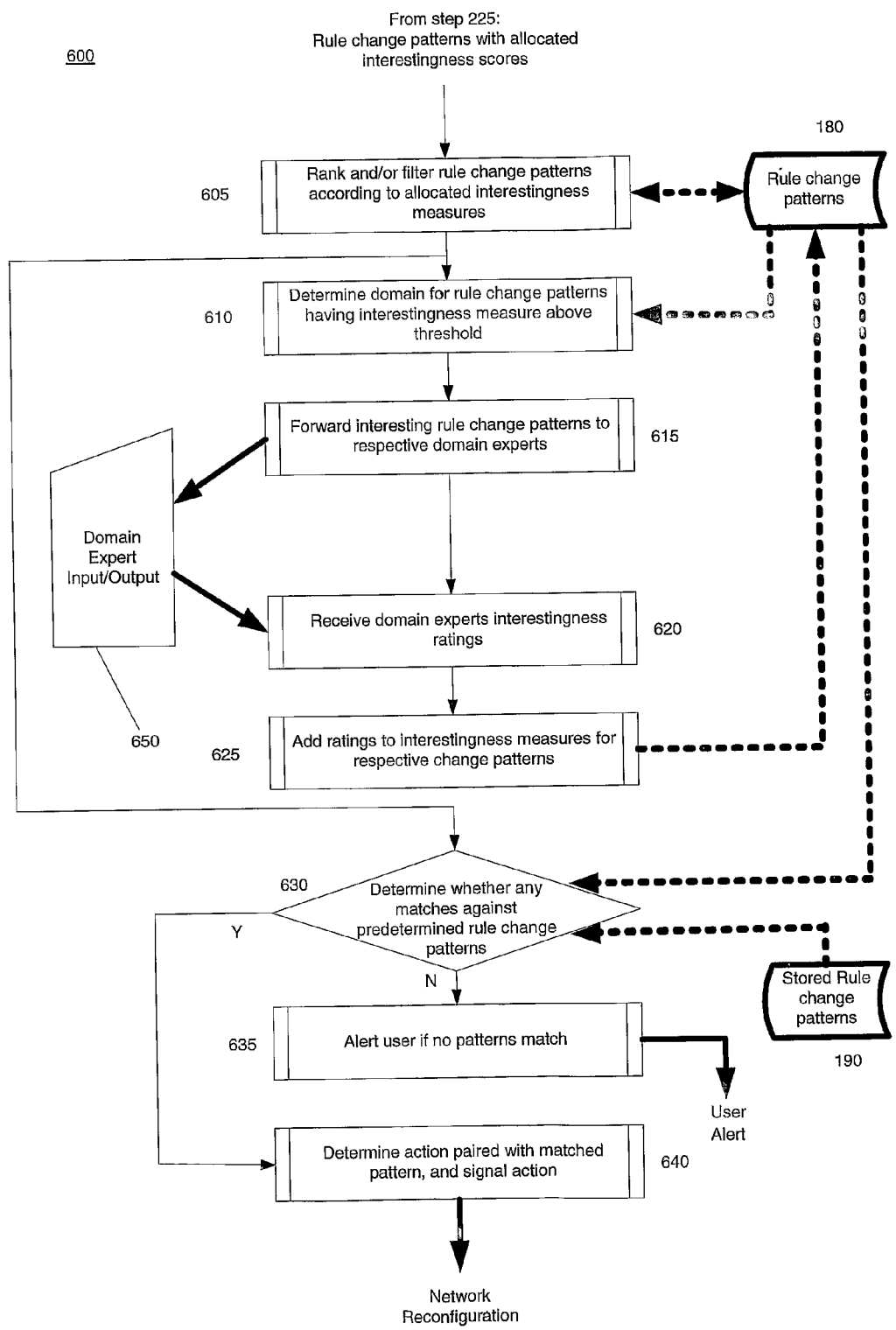
FIG. 6 illustrates an algorithm of adjusting the interestingness parameters allocated in the algorithm of FIG. 5 according to user feedback.

FIG. 6 illustrates an embodiment for outputting of identified rule change patterns in which an interestingness parameter has been allocated to the identified rule change patterns. This is used by the method (600) to rank the rule change patterns (605) in the rule change database 180 and/or for outputting. This step may also include filtering of the rule change patterns to output only those having an interestingness parameter exceeding an interestingness threshold. The method (600) then determines the appropriate user or domain expert to output the rule change patterns to (610). This may be based on the underlying rules of each rule change pattern or other factors. For example, a user in the field of Network Optimization would be more interested in trends or other mid- and long term developments, whereas a User in Network Operations would be more interested in unusual recent events, e.g. spikes.

The method (600) then forwards the rule change patterns (typically in order of interestingness) to the respective domain expert(s) or user(s) (615). This may be achieved using any suitable input/output interface 650, for example email or web-based display screen. The domain determining (610) and change pattern forwarding (615) steps correspond to the information broker 160 in FIG. 1. The domain experts may return an interestingness rating for the or each rule change pattern which they received using the same input/output interface 650. This interestingness rating is based on their own subjective assessment of the respective rule change pattern, and is received by the method (620). The interestingness rating may simply be a further (subjective) interestingness score added to or otherwise used to adjust the statistically derived interestingness scores (clarity, pronouncedness, etc), or it may be used simply to confirm/reject these. The method then incorporates the received interestingness rating with the respective rule change pattern entry in the respective rule change pattern database. This rating can then be used in the interestingness parameter generating method described above with respect to FIG. 5.

In an alternative embodiment, user feedback on the interestingness scores or measures established by the above described tests is implemented as follows. The system produces an interestingness ranking based on an aggregation of a number of n interestinguess measures or scores:

$$\bar{I} = \underset{j}{agg}(I_j)$$

The aggregation function agg can be an arbitrary combination, for example, a linear combination $\bar{I}=a_1 I_1 + \ldots + a_n I_n$ where $a_j$ is a real number that are predefined by the system designer, or a fuzzy rule base set up by the system designer for example:

If $I_1$ is high and $I_2$ is medium high and $I_3$ is ... then $\bar{I}$ is high;
If $I_1$ is low and $I_2$ is medium high and $I_3$ is ... then $\bar{I}$ is medium high;
and so on . . . .

where terms like high, medium high are represented by standard fuzzy sets such as triangular functions or Gaussians that are defined over the domain of the $I_j$ and $\bar{I}$, respectively.

The embodiment provides the user with two different ways to issue feedback for the provided interestingness ranking. Firstly, the user agrees or disagrees with a change pattern being deemed interesting or not interesting based on its position in a list of outputted change patterns and provides a new interestingness rank for the selected change pattern by either moving it to a new position in the list or by marking the change pattern with a new exact or fuzzy (high, medium, low etc) interestingness value. The system interprets the difference between the original interestingness value and the new user provided value as an error signal and uses a learning algorithm to modify the aggregation operator agg. This can be done, for example, by modifying the linear weights, if a linear combination operator is used, or by changing the fuzzy sets in the fuzzy rule base if a fuzzy rule base approach is used as an aggregation operator. The kind of learning algorithms can be regression algorithms for the case of a linear combination or a neuro-fuzzy learning algorithm in the case of a fuzzy rule base and are known to those trained in the art.

Alternatively the user selects a change pattern and points out that he is interested in change patterns that are similar to the selected change pattern or that he deems the selected change pattern and similar change patterns as not interesting. Based on a similarity measure similar change patterns are identified and their interestingness values are modified such that they appear at the top of the rank (if deemed interesting) or at the bottom of the list (if deemed not interesting). The system can then use the modified interestingness measure to change the aggregation operator described above or the new ranking is just used temporarily for the current session and the aggregation operator is not changed.

In parallel with the domain expert rating process, the method (600) may alternatively or additionally be configured to automatically react to identifying predetermined rule change patterns. For any rule change patterns whose interestingness parameter exceeds a suitable threshold, the method determines whether they match any predetermined rule change patterns (630). The mechanism for determining whether an identified rule change pattern matches a predetermined rule change pattern stored in the stored rule change pattern database 190 can be a statistical equivalence or similarity test similar to that described above for matching patterns with previously rated patterns. For example a binary vector approach may be used, although other methods will be well known to those skilled in the art. One of the pattern properties that will typically be tested for is that they are both based on the same rule. If no matching identified rule change patterns are found (630N), then the user is alerted to the interesting rule change patterns (635). This may be achieved by email or web-interface/display for example. If a matching pattern is found (630Y), an action is determined based on the predetermined matched rule change pattern (640). Each predetermined rule change pattern (or a group of such patterns) is paired with one or more actions in the stored rule change pattern database 190, so that the corresponding action can be automatically carried out when a rule change pattern match is achieved. An example action may be the reconfiguration of a physical system such as a communications network or production plant on which the original data received by the method is based, for example network operating parameters.

Figure 7:
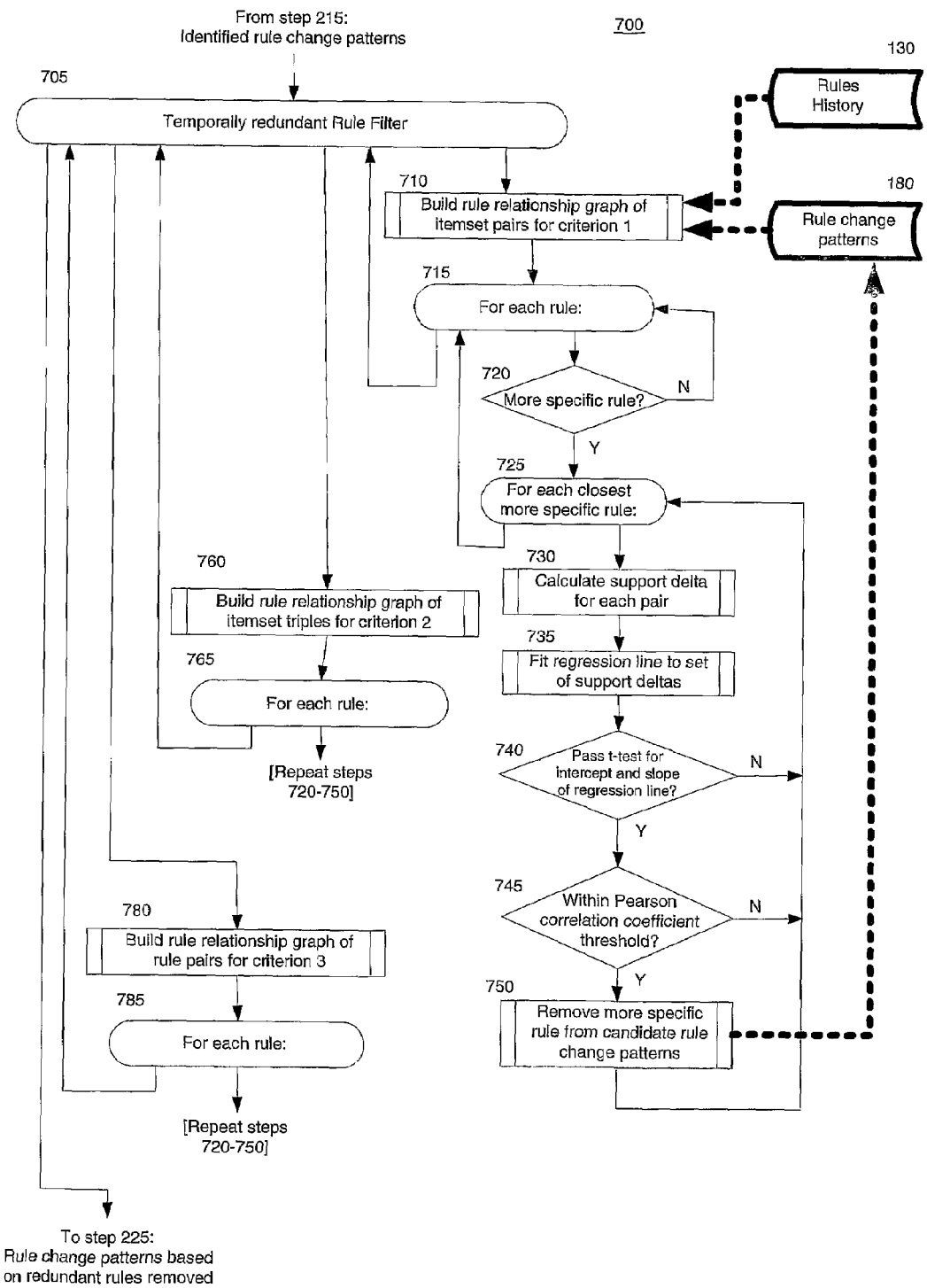
FIG. 7 illustrates an algorithm for filtering rule change patterns based on temporally redundant rules.

FIG. 7 illustrates a method for implementing temporally redundant or derivative rules based filtering. The aim of this filtering is to remove rules, and hence rule change patterns, which can be derived from a more general rule and hence are redundant and would only add to the computational processing load without providing any benefit. In this embodiment the rule associated with each identified rule change pattern is assessed in three different criteria in order to determine whether it can be said to be derivable from a more general rule. If this is the case, the rule change history associated with this rule can be removed from further processing, for example the allocation of an interestingness parameter. For each criterion (1,2,3) the method (700) builds a respective relationship graph (710, 760, 780), logically connecting rules with more specific and/or more general rules or itemsets from rules. In other words rules are logically linked to all other rules with the same itemsets less one itemset (a more general rule) or with one additional itemset (a more specific rule). For each rule (715, 765, 785) of each criterion, the method (700) tests whether a more specific rule is redundant. The method of testing for rule redundancy is the same for each criterion once the relationships between more general/specific rules are established, and so for clarity of explanation this testing method is only illustrated and described here with respect to criterion 1.

The first criterion checks if the support of an itemset can be explained with the support of exactly one less specific itemset. This corresponds to a rule r and a less general or more specific rule r' in which: r: Y=>Z, and r': XY=>Z. If this were the case, the term supp(XY, T)/supp(Y, T) would be constant over T∈T̂ given disjoint itemsets X and Y.

Rewriting the criterion as $$c = \frac{supp(\mathcal{X}\mathcal{Y}, T)}{supp(\mathcal{Y}, T)} = \frac{P(\mathcal{X}\mathcal{Y} \mid T)}{P(\mathcal{Y} \mid T)} = P(\mathcal{X} \mid \mathcal{Y}T)$$

with a constant c reveals its meaning. The probability of X is constant over time given Y, so the fraction of transactions containing X in addition to Y constantly grows in the same proportion as Y. This definition is also closely related to confidence, and states that the confidence of the rule Y→X should not change. This is implemented in the method (700) using:

$$\Delta_t supp(XY) = \Delta_t supp(Y) \quad \text{Criterion 1}$$

where the deltas or changes in support are determined over the time periods T and compared for statistical equivalence. Criterion 2 is based on the idea of explaining the support of an itemset with the support values of two subsets. Thus if the term:

$$\frac{supp(\mathcal{X}\mathcal{Y}, T)}{supp(\mathcal{X}, T) supp(\mathcal{Y}, T)}$$

is constant over T∈T̂ given disjoint itemsets X and Y, then this criterion holds and the rule associated with the itemsets XY is redundant. The measure supp(XY, T) measures the probability of the itemset XY in period T which is P(XY|T).

The term $$\frac{supp(\mathcal{X}\mathcal{Y}, T)}{supp(\mathcal{X}, T), supp(\mathcal{Y}, T)} = \frac{P(\mathcal{X}\mathcal{Y} \mid t)}{P(\mathcal{X} \mid T) P(\mathcal{Y} \mid T)}$$

is extensively used in data mining to measure the degree of dependence of X and Y at time T. Particularly in association rule mining this measure is also known as interest factor or lift. The criterion expresses the degree to which the dependence between both itemsets is constant over time. This is implemented in the method (700) using:

$$\Delta_i \text{supp}(XY) = \Delta_i \text{supp}(X) \Delta_i \text{supp}(Y) \quad \text{Criterion 2}$$

where the deltas or changes in support are determined over the time periods T and compared for statistical equivalence.

Criterion 3 deals with derivative confidence histories of rules. The term $$\frac{\text{conf}(r, T)}{\text{conf}(r', T)}$$

is constant over $T \in \hat{T}$ given two rules r and r' with $r \prec r'$. Assuming the rules $r = XY \Rightarrow z$ and $r' = Y \Rightarrow z$ with disjoint itemsets X and Y, the criterion translates to $$\frac{P(z \mid \mathcal{XY}T)}{P(z \mid \mathcal{Y}T)}$$

being constant over time. This basically means that the contribution of X in addition to Y to predict z relative to the predictive power of Y remains stable over time and can therefore be neglected. The confidence history of r is derivative because of $$\text{conf}(r, T) = f(\text{conf}(r', T)) = c \cdot \text{conf}(r', T)$$

with constant $c = \dfrac{\text{conf}(r, T')}{\text{conf}(r', T')}$ for any $T' \in \hat{T}$ This is implemented in the method (700) using:

$$\Delta_i \text{conf}(r) = \Delta_i \text{conf}(r') \quad \text{Criterion 3}$$

where the deltas or changes in confidence are determined over the time periods T and compared for statistical equivalence.

Whilst the equations for implementation in the algorithm of FIG. 7 for each criterion have been given above, the interested reader is referred to the following publication for an detailed examination of their derivation and theoretical underpinnings: Boettcher, M., Spott, M., and Nauck, D. (2005). Detecting temporally redundant association rules. In Proceedings of 4th International Conference on Machine Learning and Applications, pages 397-403, Los Angeles, USA. IEEE Computer Society.

Figure 8:
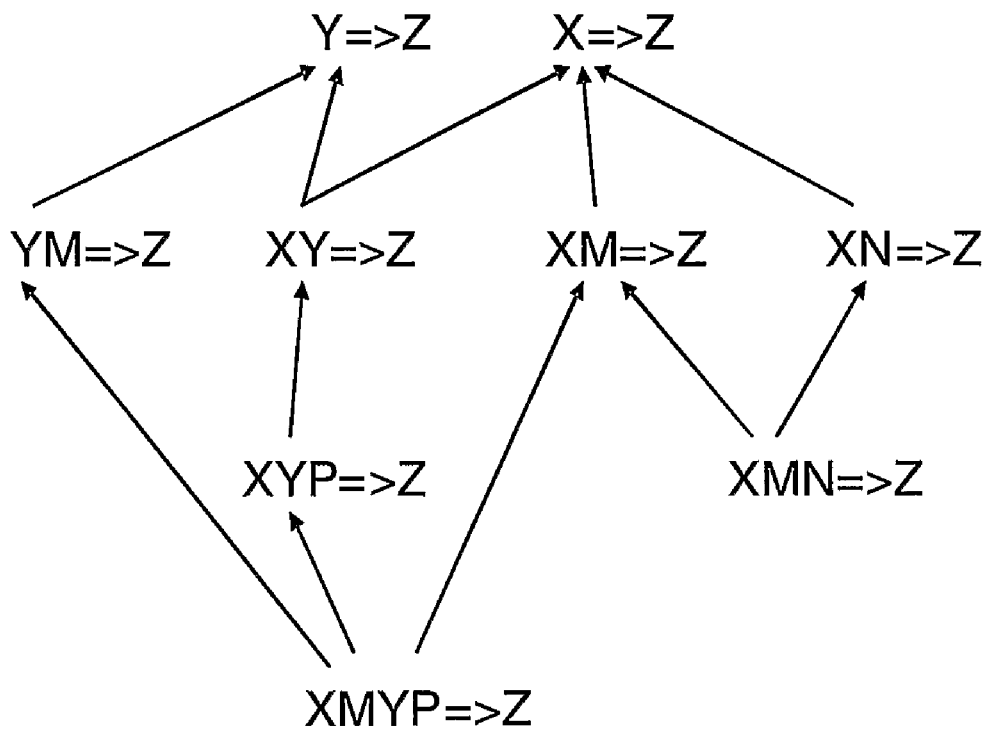
FIG. 8 shows a rule relationship graph representing the links between a rule and more specific and more general rules.

For each rule change pattern in the rule change database 180, the method (700) checks each of the three criteria in turn or until the underlying rule for the current rule change pattern is found to be redundant according to one of the criterion (705). The next rule change pattern is then assessed. Firstly, for criterion 1, the method builds a rule relationship graph (710), a partial example of which is illustrated in FIG. 8. For criterion 1, the method looks at pairs of rules that are related in terms of one being more general than the other one. As criterion 1 is related to the support history of the rules, the criterion 1 algorithm does not actually look at rules themselves but simply their itemset. For example in case of a r1: XY=>Z and r2: X=>Z, the algorithm uses the itemsets XYZ and XY respectively. Thus there are pairs of itemsets with one being more general (a superset) then the other one, for example X and XY. The algorithm tests if the support history of XY can be explained with the support history of X. The build graph step (710) determines all connection between a rule r' and a more general rule r, as well as any more specific rules r". This is demonstrated in FIG. 8 by the rule r': XY=>Z for example, which has more general rules r1: Y=>Z and r2: X=>Z, as well as a more specific rule r": XYP=>Z. The graph illustrated in FIG. 8 is a representation of the connections between the rules which can be built up as is known using a simple algorithm by analyzing the itemsets of the rules associated with the identified rule change patterns.

Criterion 2 looks at triples of itemsets with two itemsets (X and Y) being more general than the third itemset (like XY). The algorithm tests if the support history of XY can be explained with the support history of X and Y. The algorithm builds a rule relationship graph of itemset triples for testing criterion 2 (760) using a suitable algorithm as would be known by those skilled in the art.

Criterion 3 concerns the confidence history of rules, and the algorithm tests if the confidence history of a rule XY=>Z can be explained with the history of a rule X=>Z. The algorithm builds a rule relationship graph of rule pairs for testing criterion 3 (780) using a suitable algorithm as would be known by those skilled in the art.

Once the rule relationship graphs have been built for each criterion, the algorithm tests whether the support/confidence for the respective itemset/rule pairs or triples are statistically equivalent, and if they are removes the redundant derivative rule and associated rule change pattern from further processing. Typically the algorithm starts from the most general rules, and for each of the closest more specific rules, tests if it is redundant (715, 765, and 785). However other approaches are possible as will be appreciated by those skilled in the art, for example a bottom-up approach where the algorithm starts at the most specific rules and works towards the most general.

Using an assumption of transitivity, only rules together with their closest more general or more specific rules need to be tested. Thus for example for a rule XM=>Z, the algorithm only looks at the closest, more specific rules which are XMYP=>Z and XMN=>Z (using the top-down approach). Transitivity means that given X=>Z explains XY=>Z which in turn explains XYP=>Z, we assume that X=>Z explains XYP=>Z.

For each rule in the rule relationship graph, the method determines whether a more specific one exists (720), and if so (720Y), tests the current rule against the or each more specific rule (725). The testing algorithm used is the same for each criterion, it is just used on different itemset/rule measures (support or confidence) and the rule relationship graphs will generally be different for each criterion. The method (700) calculates the support deltas for each pair of general and more specific rules, or the changes in support over each time period for each rule in the pair (730). This is expressed in the equation: Criterion 1: $\Delta_i$ supp(XY)=$\Delta_i$ supp(Y). A similar calculation is carried out for criterion 2, however the deltas are: Criterion 2: $\Delta_i$ supp(XY)=$\Delta_i$ supp(X)$\Delta_i$ supp(Y) in which the delta in support for the itemsets X and Y individually are multiplied together and then tested against the support deltas (i.e. the changes in support over the time periods) for the itemset XY. Similarly, for criterion 3, the deltas are: Criterion 3: $\Delta_i$ conf(r)=$\Delta_i$ conf(r') in which the changes in the confidences of the more general and the more specific rule pairs are tested.

Once the deltas (support or confidence depending on criterion) for each time period have been calculated for each itemset or rule pair, a regression line is fitted to each delta set (735). The regression line will have a slope or gradient A and an intercept B, as well as a variance V. A statistical approach is used to test whether the two regression lines are statistically equivalent. Firstly the well known t-test is used to test whether the intercept B and slope A of the two lines are statistically different or equivalent (740). If this test does not establish equivalence (740N), the method returns to test the next close specific rule pair (725) or the next rule (715) or on to the next criterion (705). If the t-test determines equivalence (740Y), the method then determines whether the regression lines are within a Pearson correlation coefficient threshold (745)— again a well known statistical measure. If not (745N), the method returns to test the next rule (725, 715, 705). If however the regression lines are within the Pearson correlation coefficient (745Y) they are deemed to be statistically equivalent which implies that the more specific rule can be derived directly from the more general rule, and hence is redundant. The method then removes the more specific rule and its associated rule change pattern from the rule change database 180 in order to remove them from further processing (750). The method then returns to check the next rule pair (725).

After testing the criterion 1 general/specific rule support itemset pairs (715), the method moves on to check the criterion 2 general/specific rule support itemset triples (765) by first building a rule relationship graph of the rules remaining after the criterion 1 algorithm. Similarly the method then moves on to the criterion 3 general/specific rule confidence pairs using the rules remaining after the criterion 2 algorithm. In this way derived or redundant rules and their rule change patterns are removed from the allocating interestingness parameters steps. The approach treats confidence and support independently. This means, a rule can be temporally redundant regarding one measure, but non-redundant regarding another. For this reason, the filter first tests whether Criterion 1 or 2 hold. If true it is flagged that the rule (and the change pattern) are redundant with regard to support. Independent of the result of the first two tests it is then tested whether Criterion 3 holds. If true it is flagged that the rule (and the change pattern) is redundant with regard to confidence.

Whilst the above embodiments have been described with respect to monitoring and optionally controlling a network or other physical system, the system may also be used for the monitoring and analysis of business related data such as retail sales and customer satisfaction. Many businesses collect huge volumes of data. Commonly this data is continuously gathered over long periods and thus reflects changes in the parts of the business from which it has been derived. To control their business operations and to gain a competitive edge, it is desirable for businesses to detect these changes early and precisely. The widely used method of defining key performance indicators is too weak to detect changes early enough and requires time-consuming in-depth analysis before decisions can be made. Currently, the technology provided by almost all business analytics software, like Siebel or SAP BI, analyses changes in Key Performance Indicators (KPIs). These are quantifiable measurements that aim to assess the improvement of a business's critical success factors and to measure the progress towards its business goals. Updated in regular intervals they give insight on how certain aspects of a business evolved in the past and how it might perform in the future. Key Performance Indicators usually are long-term considerations. Their definition and the way they are measured may only change as the business goals change. Technically, a Key Performance Indicator is often an aggregated value obtained by simple descriptive statistics. For example, if one of the business's goals is to improve customer retention a reasonable Key Performance Indicator would be the relative frequency of churners within a certain time period. While KPIs are a useful tool for strategic control and decision making on an upper management level, they have several shortcomings on the operational levels: first, discovered changes are biased to what a user expects from its business described in terms of business goals. Many other changes, in particular those which were not anticipated beforehand, remain unrevealed. Second, the used descriptive statistics are rather coarse-grained. Changes within more subtle aspects of a domain can not be detected. The range of observable changes is therefore significantly limited by the user's expectations about its business-many other interesting changes may remain unrevealed. For example, for the churn-related KPI defined above changes within smaller populations, like customers over the age of 50, cannot be detected. In general, the obstacle connected with this type of analysis is the user's lack of knowledge about many interesting co-occurring attribute values.

State of-the-art knowledge discovery techniques, on the other hand, provide the required level of detail, but assume that the domain under consideration is stable over time. In contrast, embodiments can provide a framework that detects changes within a data set at virtually any level of granularity, and without specifying what to look for in advance. An embodiment can derive a rule-based (or other structural) description of the data set at different points in time and subsequently analyse how these rules change.

A human's competence to spot problems before they occur is significantly determined by a human's ability to register and analyse how certain aspects of the domain of interest change. Known data mining methods, however, assume implicitly that the domain under consideration is stable over time and thus provide a rather static view on the patterns and knowledge hidden in gathered data. This is undesirable in time-stamped domains, since the data then captures and reflects external influences like management decisions, economic and market trends, and changes in customer behaviour. For churn management for example, the analysis of pattern change would enable a business to answer questions like: which factors are gaining more influence on customer churn and may be significant in the future? Emerging causes for customer churn can thus be detected before they affect a large group of customers and business processes can be adapted in time. The detection of interesting and previously unknown changes in data not only allows the user to monitor the impact of past business decisions but also to prepare today's business for tomorrow's needs.

However the data pattern change approach to business data analysis still delivers an enormous amount of information— rule change patterns for example—which would overwhelm a human analyst, and so the embodiment provides a means of filtering and/or ranking the discovered rule change patterns before presentation to a human user. Embodiments can use a redundant descriptions filter together with or alternatively an interestingness ranking or interestingness parameter allocation means in order to aid identifying only interesting patterns in order to reduce the effort (and/or make this more efficient) on the human user. As discussed previously, only change patterns exceeding a certain interestingness threshold may be presented to the user, or the patterns may be ranked according to the values of their interestingness patterns. Also as discussed above, the user(s) may allocate interestingness ratings using a suitable feedback mechanism.

Thus in some embodiments, certain discussed data change patterns (e.g. rule change patterns) are presented to (appropriate) users without automatically affecting a physical system (e.g. network) based on detected data change patterns. Such data change patterns may be based on business data such as churn and retail sales data, or technical data describing physical entities such as high energy physics particles, product reliability, manufacturing plant parameters or network operating parameters for example.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

The skilled person will also appreciate that the various embodiments and specific features described with respect to them could be freely combined with the other embodiments or their specifically described features in general accordance with the above teaching. The skilled person will also recognise that various alterations and modifications can be made to specific examples described without departing from the scope of the appended claims.

What is claimed is:

1. A method for controlling a network using operating data for the network, the method comprising:
   receiving network operating data;
   dividing the received network operating data into sequential time periods and, for each of said sequential time periods:
   (i) determining support and/or confidence of an association rule for the data received in each of said sequential time periods, and
   (ii) identifying a trend or stability in the respective support and/or confidence history of the association rule over a plurality of said sequential time periods to identify an association rule change pattern, and
   controlling the network using a predetermined action corresponding to a predetermined association rule change pattern in response to the identified association rule change pattern matching the predetermined association rule change pattern.

2. A method according to claim 1, further comprising outputting the identified change pattern to a network operator.

3. A method according to claim 1, further comprising filtering association rules which are temporally redundant compared with other association rules.

4. A method according to claim 1, wherein identifying change patterns comprises applying a trend statistical test to each determined association rule in order to identify any trends, and applying a stability statistical test to each determined pattern in order to identify any stabilities.

5. A method according to claim 1, further comprising allocating an interestingness parameter to the identified one or more association rule change patterns depending on one or more statistical measures of a respective association rule change pattern and outputting the identified change patterns depending on their respective interestingness parameters.

6. A method according to claim 5, further comprising receiving an interestingness rating for an identified association rule change pattern from a user, and wherein allocating an interestingness parameter to the identified change patterns further comprises adjusting the parameter dependent said interestingness rating.

7. A method according to claim 5, further comprising:
   receiving an interestingness rating for a first identified association rule change pattern from a user;
   adjusting the interestingness parameter for a second identified association rule in response to determining that the second identified association rule is similar to the first identified change pattern.

8. A method according to claim 5, wherein allocating an interestingness parameter comprises calculating and combining a number of statistical measures for the respective association rule.

9. A method according to claim 8, wherein the statistical measures test for the following statistical properties: clarity; pronouncedness; dynamic; homogeneity.

10. A processor code product comprising non-transitory digital storage media carrying processor code which, when executed on a processor, causes the processor to carry out a method according to claim 1.

11. A data processing apparatus for controlling a network using operating data for the network, the apparatus comprising:
   an input for receiving network operating data;
   a processor configured to:
   divide the received data into sequential time periods,
   determine support and/or confidence of an association rule for the received data in each time period;
   identify a trend or stability in the respective support and/or confidence history of the association rule over a plurality of said sequential time periods to identify an association rule change pattern, and to control the network using a predetermined action corresponding to a predetermined association rule change pattern in response to the identified association rule change pattern matching the predetermined association rule change pattern.

* * * * *

UNITED STATES PATENT AND TRADEMARK OFFICE
CERTIFICATE OF CORRECTION

PATENT NO. : 8,407,176 B2  
APPLICATION NO. : 12/299347  
DATED : March 26, 2013  
INVENTOR(S) : Boettcher et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 831 days.

Signed and Sealed this
First Day of September, 2015

Michelle K. Lee
*Director of the United States Patent and Trademark Office*